H. FAUROT, Jr.
WINDOW MOUNTING DEVICE.
APPLICATION FILED APR. 26, 1922.
1,421,927.
Patented July 4, 1922.
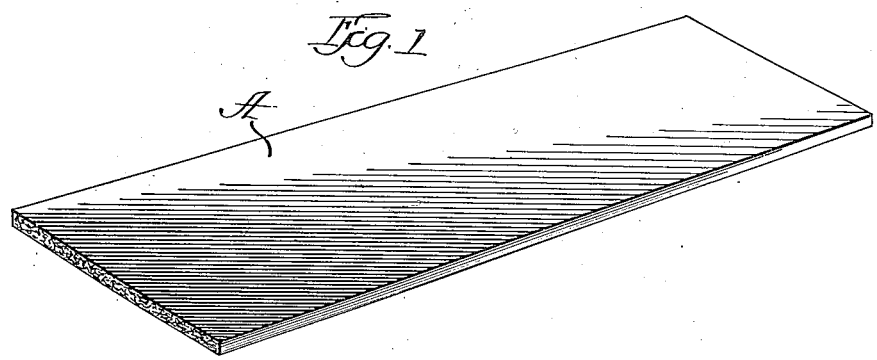
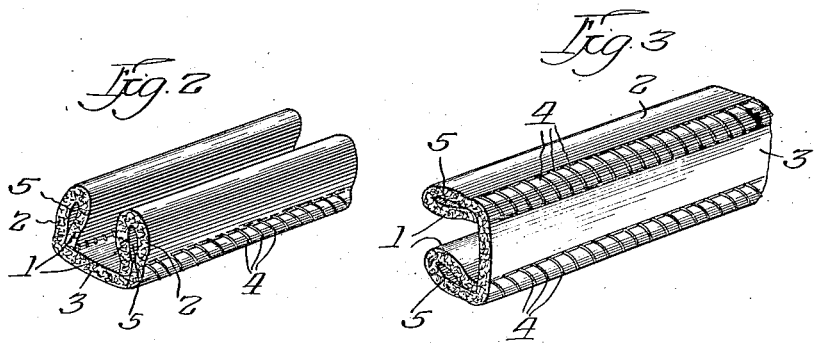
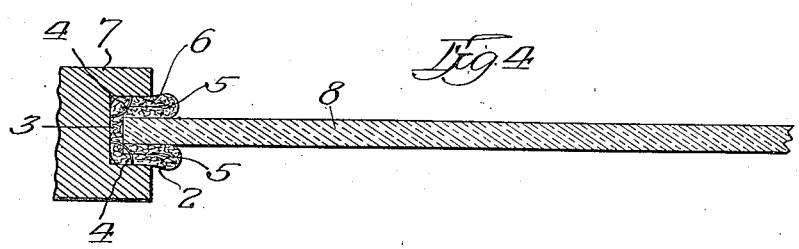
Witness:
Inventor
Henry Faurot, Jr.
By Allen M. Reed
Atty

UNITED STATES PATENT OFFICE.

HENRY FAUROT, JR., OF CHICAGO, ILLINOIS, ASSIGNOR TO WESTERN FELT WORKS, OF CHICAGO, ILLINOIS, A CORPORATION OF WEST VIRGINIA.

WINDOW-MOUNTING DEVICE.

1,421,927.      Specification of Letters Patent.      Patented July 4, 1922.

Application filed April 26, 1922. Serial No. 556,608.

*To all whom it may concern:*

Be it known that I, HENRY FAUROT, Jr., a citizen of the United States, and resident of Chicago, in the county of Cook and State of Illinois, have invented a certain new and useful Improvement in Window-Mounting Devices, of which the following is a full, clear, concise, and exact description, reference being had to the accompanying drawing, forming a part of this specification.

The present invention relates to devices for mounting glass windows which are subject to vibration, such as the windows of an automobile, and its principal object is the provision of a mounting that will securely hold the window pane and protect it from vibration and that may be manufactured at very low cost. A preferred form of the invention is illustrated and described herein.

In the drawings,—

Figure 1 is a perspective view of a strip of material from which the mounting is formed.

Figures 2 and 3 are perspective views of the mounting.

Figure 4 illustrates the mounting applied to a window.

The mounting is manufactured from a strip A of flexible material, preferably felt, which is entirely plane and need only be cut to the proper width. Lateral portions 1 of the strip are then folded over upon the body of the strip, after which the portions 1 and the underlying portions 2 are again folded up at an angle to the body of the strip along the inturned edges of the portions 1, so that a channel is formed consisting of a bottom wall 3 and side walls comprising the folded over portions 1 and 2. The side walls are then sewed to the bottom wall 3 by respective threads 4 which are sewed through the bottom wall, exteriorly around the juncture of the side walls and the bottom wall, through the portions 2, and through the inturned edge of the portions 1. The sewing is done in such manner as to bind the side walls securely to the bottom wall of the channel and so as to cause the side walls to tend to approach each other, while at the same time the juncture of the side walls with the bottom wall is firmly reinforced. Air cushioning spaces 5 are formed between the two layers of which each of the side walls is composed.

In use, the channeled strip thus formed has its base seated in a channel 6 formed in a window frame 7 with the side walls projecting beyond the walls of the channel 6. The glass pane 8 is then seated in the channeled strip. The reinforcement of the juncture of the bottom wall of the channeled strip with its side walls gives the strip strength and stability and since the reinforcement causes the side walls to tend to approach each other, there is assurance that the glass pane seated in the channeled strip will always be securely gripped by the side walls of the strip. Nevertheless, the side walls are yielding, and in addition the air cushioning space between the redoubled portions forming the side walls completely protects the glass pane from injury by vibration.

Having thus described my invention, what I claim as new and desire to secure by Letters Patent of the United States is:—

1. A window mounting device, comprising a channeled strip of flexible material adapted to have its base inserted in a channeled frame, the junctions of the side walls and bottom wall of the strip being so reinforced as to cause the side walls to tend to approach each other, the side walls being formed by portions of the material doubled upon itself.

2. A window mounting device, comprising a single normally flat strip of felt of uniform cross section bent into channeled form and adapted to have its base inserted in a channeled frame, the side walls of the channeled strip being formed by folding the lateral portions of the flat strip upon the body thereof and bending the doubled portions of the strip upwardly from the body thereof, the side walls of the strip being sewed to the bottom wall so as to reinforce the junctions and cause the side walls to tend to approach each other.

3. A window mounting device, comprising a channeled strip of flexible material adapted to have its base inserted in a channeled frame, the junctions of the side walls and bottom wall of the strip being so reinforced as to cause the side walls to tend to approach each other.

4. A window mounting device, comprising a channeled strip of felt adapted to have its base inserted in a channeled frame, the junctions of the side walls and bottom wall of the strip being bound to cause the side walls to tend to approach each other.

5. A window mounting device, comprising a single normally flat strip of felt bent into channeled form and adapted to have its base inserted in a channeled frame, the side walls of the strip being sewed to the bottom wall so as to reinforce the junctions of said walls and cause the side walls to tend to approach each other.

6. A window mounting device, comprising a single normally flat strip of felt of uniform cross-section bent into channeled form and adapted to have its base inserted in a channeled frame, the side walls of the strip being sewed to the bottom wall so as to reinforce the junctions and cause the side walls to tend to approach each other.

In witness whereof, I hereunto subscribe my name this 24 day of April, 1922.

HENRY FAUROT, Jr.